(12) United States Patent
Zink et al.

(10) Patent No.: US 6,518,506 B2
(45) Date of Patent: Feb. 11, 2003

(54) INSULATING BODY FOR A CONNECTOR FOR THE TRANSMISSION OF OPTICAL AND ELECTRICAL SIGNALS

(75) Inventors: Markus Zink, Stuttgart (DE); Frank Andrä, Deizisau (DE)

(73) Assignee: Contact GmbH, Stuttgart (DE)

( * ) Notice: Subject to any disclaimer, the term of this patent is extended or adjusted under 35 U.S.C. 154(b) by 0 days.

(21) Appl. No.: 09/949,946

(22) Filed: Sep. 10, 2001

(65) Prior Publication Data

US 2002/0029898 A1 Mar. 14, 2002

(30) Foreign Application Priority Data

Sep. 11, 2000 (DE) .......................... 100 44 790

(51) Int. Cl.⁷ .............................................. H01B 17/00
(52) U.S. Cl. ............................. 174/138 R; 174/138 G; 174/152 R; 174/152 G; 174/153 G; 174/167; 385/71
(58) Field of Search ................. 174/138 R, 138 G, 174/152 R, 152 G, 153 G, 167; 385/71

(56) References Cited

U.S. PATENT DOCUMENTS

| | | | |
|---|---|---|---|
| 4,296,999 A | * 10/1981 | Mead | 385/61 |
| 4,650,276 A | * 3/1987 | Lanzisera et al. | 385/88 |
| 5,076,656 A | * 12/1991 | Briggs et al. | 385/60 |
| 5,095,517 A | * 3/1992 | Monguzzi et al. | 250/227.11 |
| 5,386,486 A | * 1/1995 | Fan et al. | 385/59 |
| 6,129,559 A | * 10/2000 | Hirata et al. | 174/253 |

FOREIGN PATENT DOCUMENTS

| | | |
|---|---|---|
| DE | 199 45 173 A1 | 3/2000 |
| WO | WO 97/31407 | 8/1997 |

* cited by examiner

Primary Examiner—Dean A. Reichard
Assistant Examiner—Jinhee J Lee
(74) Attorney, Agent, or Firm—Wood, Herron & Evans, L.L.P.

(57) ABSTRACT

The present invention relates to an insulating body which comprises a lower part with a first engaging element, a second engaging element, and a stop, as well as an upper part with a distance collar and an engaging means arranged at the distance collar. In a first engagement position in which the first engaging element is engaged with the engaging means electrical and/or optical contacts can be arranged in the insulating body. In a second engagement position the second engaging element engages with the engaging means, with the stop of the lower part contacting the distance collar. In this manner it is ensured that the upper and lower part, due to the effective connection of the stop and the distance collar, on the one hand, securely engage with one another and, on the other hand, due to the effective connection of the stop and the distance collar assume a pregiven position relative to one another at any time.

13 Claims, 4 Drawing Sheets

INSULATING BODY FOR A CONNECTOR FOR THE TRANSMISSION OF OPTICAL AND ELECTRICAL SIGNALS

FIELD OF THE INVENTION

The present invention relates to an insulating body to be used with a connector, which enables the transmission of electrical signals by means of conventional electrical conductors and of optical signals by means of optical conductors as well as of electrical signals of so-called "twisted pair" conductors.

BACKGROUND OF THE INVENTION

For the transmission of signals between conductors, connectors are used which comprise insulating bodies which are arranged in their housing components. The conductors are connected with contacts within the insulating bodies, which are connected with corresponding contacts of an associated insulating body for signal transmission to other conductors, to which the other conductors are electrically connected.

For the transmission of electrical signals of conventional electrical conductors (e.g. copper conductors), for the transmission of electrical signal of special electrical conductors (e.g. so-called "twisted pair" conductors), and for the transmission of optical signals of optical conductors (e.g. fibre conductors) different connectors are generally used which are tailored to the respective application. This approach results in that different connector types are required for the connection of lines which comprise different conductor types and/or transmit different signals. For connecting such lines by means of one connector type it is necessary that the connectors, and in particular their insulating bodies, account for the characteristics of the different conductors and/or different signals.

Contrary to conventional copper conductors which can be connected by means of plug contacts and socket contacts arranged in the insulating bodies, special requirements are to be considered when using optical conductors for the transmission of optical signals. For instance, it is not possible to use similar connections with electrical pin and socket contacts. For the electrical transmission of signals it is essentially sufficient if the pin and socket contacts are connected with each other in an electrically conductive manner at one point. Compared to that, special importance is attributed to a contact point between optical conductors in the transmission of optical signals because undesired signal deteriorations, in particular damping of optical signals, may occur there.

In order to be able to connect common electrical (copper) conductors and "twisted pair" conductors with one connector type, insulating bodies are therefore required which, in addition to conventional pin and socket contacts for electrical conductors, also provide electrically conductive connections for "twisted pair" conductors, which are connections comparable to "crimp" connections.

STATE OF THE ART

From WO97/31407 an electrical connector is known which comprises a first part with first and second engaging elements and a first abutment surface and a second part with a means for engaging the engaging elements and a second abutment surface. For the arrangement of electrical conductors in the connector, the first engaging elements are engaged with the second part, electrical conductors are arranged in bushings of the first and second part, and the second engaging elements are engaged with the second part in order to secure the electrical conductors within the connector. Upon engagement of the second engaging elements with the second part, the first and second abutment surfaces contact each other. The bushings in the connector comprise spring elements which, relative to the bushings, exert radially inwardly acting forces on the electrical conductors. DE 199 45 173 A1 discloses a connector for lightwave fibre cables with holes for accommodating ends of lightwave fibre cables. The connector comprises one crimp each within the holes for locating ends of the lightwave fibre cables.

OBJECT OF THE INVENTION

It is the object of the invention to provide an insulating body which allows the transmission of electrical and optical signals and/or electrical signals by means of conductors of different types. In particular, the invention is to enable the use of contacts in an insulating body for the transmission of optical signals and/or contacts for the transmission of electrical signals of "twisted pair" conductors in addition to conventional pin and socket contacts for electrical signals.

SUMMARY OF THE INVENTION

As mentioned above, it is required for the transmission of optical signals between optical conductors that the components used for the transmission (i.e. optical contact elements) are positioned relative to each other in such a manner that no optical signal deteriorations (e.g. damping) occur at the contact points. For this purpose it is necessary that insulating bodies of connectors used for the connection ensure an exact as possible positioning of the optical contacts.

Compared to that the requirements for the positioning of conventional electrical pin and socket contacts in an insulating body are significantly lower, because an electrical transmission is ensured therein as long as the electrical contacts are connected with each other in a conductive manner.

In order to meet these conflicting requirements by an insulating body for a connector, the approach was chosen in the present invention to design the construction of an insulating body in such a manner that for the compensation of tolerances of the insulating body and of components to be used in connection with same signal transmission components (e.g. contacts) to be arranged in the insulating body can be positioned exactly and reproducibly.

Based on this solution, it was found that an insulating body can also be used in connection with "twisted pair" conductors if signal transmission components (e.g. contacts) are used for these conductors, which are designed in a manner comparable to optical connections. In this case, too, it is required to be able to position the contacts for "twisted pair" conductors in an insulating body exactly and reproducibly.

This is solved by an insulating body according to claim 1, which is designed for the transmission of electrical and/or optical signals in a connector. The insulating body comprises a lower part with a first engaging element, a second engaging element, and a stop, as well as an upper part with a distance collar and an engaging means arranged at the distance collar. The first engaging means serves to engage the lower and upper part in a first engagement position, with the first engaging element being engaged in the engaging means. In a second engagement position the second engaging element of the lower part engages with the engaging means of the upper part, with the stop being in a mechanically effective connection with the distance collar.

The use of the second engaging element and the stop at the lower part in connection with the engaging means and the distance collar ensures that the lower and upper part, due to the effective connection of the second engaging element and the engaging means, on the one hand, are in secure engagement with one another and, on the other hand, due to the effective connection of the stop and the distance collar assume a pregiven position at any time.

In the second engagement position, the inventive insulating body is in its working position in which it can be inserted into a corresponding connector. The first engagement position corresponds to a condition of the insulating body in which electrical and/or optical contacts can be exactly positioned within same.

According to the invention the lower part comprises bushings for accommodating optical conductors and/or special electrical conductors (e.g. "twisted pair" conductors) and a spring element in at least one bushing. In the second engagement position the spring elements generate spring forces acting on the optical and/or electrical conductors arranged within said bushings. These spring forces urge the corresponding optical and/or electrical conductors into desired positions relative to the insulating body whereby tolerances of the optical and/or electrical conductors themselves arranged in the insulating body are compensated.

Preferably, the spring elements generate spring forces acting on these optical and/or electrical conductors in the first engagement position as well, in order to pre-position them. In order to simplify the assembly of the insulating body, the spring forces generated in the first engagement position are smaller than the spring forces generated in the second engagement position.

In addition, the lower part of the inventive insulating body may have a means for the structurally consistent integration of a printed circuit board into the insulating body and thus into a connector to be used with same. The use of suitable printed circuit boards, more precisely, the use of suitable circuits arranged on the printed circuit boards, enables the processing of optical and/or electrical signals of the previously mentioned optical conductors and/or special electrical conductors, to optimise their transmission.

In order to simplify the assembly of the insulating body with contacts for conventional electrical conductors (e.g. copper conductors), the bushings of the lower part for such conductors comprise a gripping collet each. In the second engagement position, the gripping collets assume a locking position in order to secure a corresponding electrical conductor in the insulating body. The gripping collets are, in particular, elastic components formed at the lower part, which in the second engagement position are elastically deformed and due to the mechanically effective connection resulting therefrom with the electrical conductors routed through the gripping collets secure these in the insulating body.

In addition, it is provided that the gripping collets assume a release position in the first engagement position, which enables the easy assembly and/or disassembly of electrical conductors, or to be more precise, the insertion and/or removal into or from the corresponding bushings in the lower part.

In order to have the gripping collets assume the locking position in the second engagement position, the bushings of the upper part associated with the bushings of the lower part comprising the gripping collets have an area each which, in the second engagement position, acts on the corresponding gripping collet in such a manner that it is moved into the locking position.

Preferably these bushings of the upper part comprise a mounting area each in which the corresponding gripping collet is arranged at least partially in the first engagement position and assumes its release position.

The first and/or the second engaging elements of the lower part can comprise one notch or several notches each. In order to also enable a visual inspection of the two engagement positions, the engaging means of the upper part comprises at least one engagement window which is formed in the distance collar. Alternatively or in addition it is possible that the engaging means of the upper part comprises at least one recess formed in the distance collar. This can be advantageous with small insulating bodies because the mechanical stability of the distance collar is thereby increased.

In the most simple case, the spring elements arranged in the bushings of the lower parts are plate spring type springs extending transversely to the longitudinal direction of a corresponding bushing, which are preferably formed integrally with the lower part.

It is further provided to use spring elements which essentially extend transversely to the longitudinal direction of corresponding bushings and which comprise an at least partially spiral-shaped form. The spiral-shaped form allows to route optical and/or electrical conductors which are to be subjected to a spring force through the spiral-type spring elements. For the transmission of the desired spring force the spiral-type spring elements and in particular their diameters are to be dimensioned depending on the conductors to be used.

The means for the structurally consistent integration of a printed circuit board preferably comprises two printed circuit board locating elements which extend from the lower part and serve to accommodate and secure printed circuit boards. In addition, this means can also comprise a printed circuit board receptacle which is formed in the lower part and which is at least partially connected with the bushings comprising the spring elements. This connection of the bushings and the printed circuit board receptacle allows to route corresponding conductors from a printed circuit board into and through the bushings in a convenient manner.

BRIEF DESCRIPTION OF THE FIGURES

In the following description of preferred embodiments reference is made to the accompanying figures in which.

PREFERRED EMBODIMENTS

Preferred embodiments of the invention will be explained by way of the example of an insulating body with an essentially round cross-section for use in round connectors and for the transmission of electrical signals as well as of optical signals. In optical conductors connectors with a rectangular cross-sections are partly used in order to be better distinguishable from connectors for electrical signals. The invention therefore also provides insulating bodies with an essentially rectangular cross-section to be used in corresponding connectors.

In addition, an insulating body was used for the description of preferred embodiments which can be used as a socket insert in a connector. In order to be able to use the insulating body as a connector insert, no significant changes of the construction of same are required. In context with the insulating body only plug contacts have to be used the shape of which ensures the effective connection which will be described in the following for providing its function.

The insulating body described in the following permits transmission of optical signals of up to two optical conductors and of electrical signals of up to four electrical conductors (e.g. copper lines). The number of possible optical and electrical conductors to be used is, however, not limited to this example but, e.g. depending on the size of the insulating body and its respective application, can be selected as desired. For instance, insulating bodies for 1, 2, 3, 4, 5, . . . , optical conductors and 1, 2, 3, 4, 5, . . . , electrical conductors in any combinations of these are provided.

Figure 1:
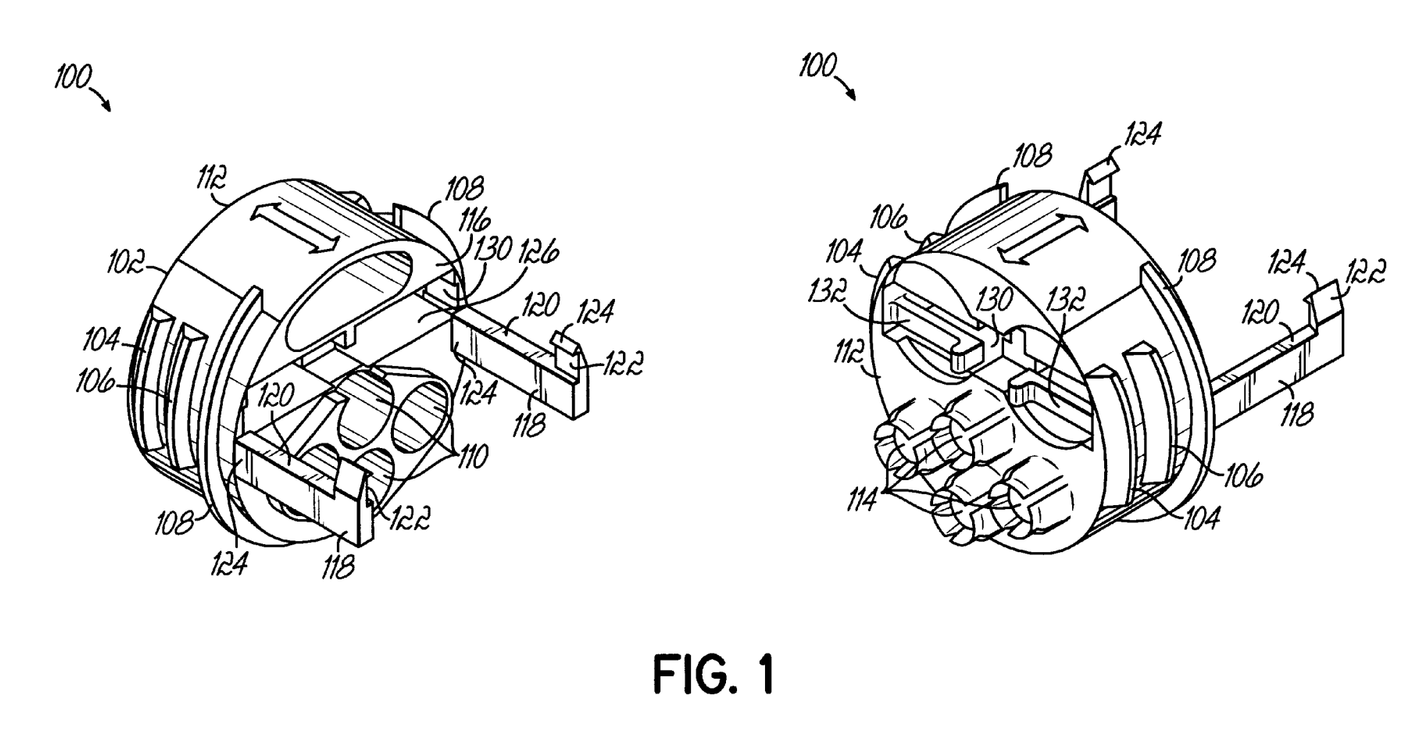
FIG. 1 is a schematic representation of an embodiment of the upper part of an inventive insulating body.
Figure 2:
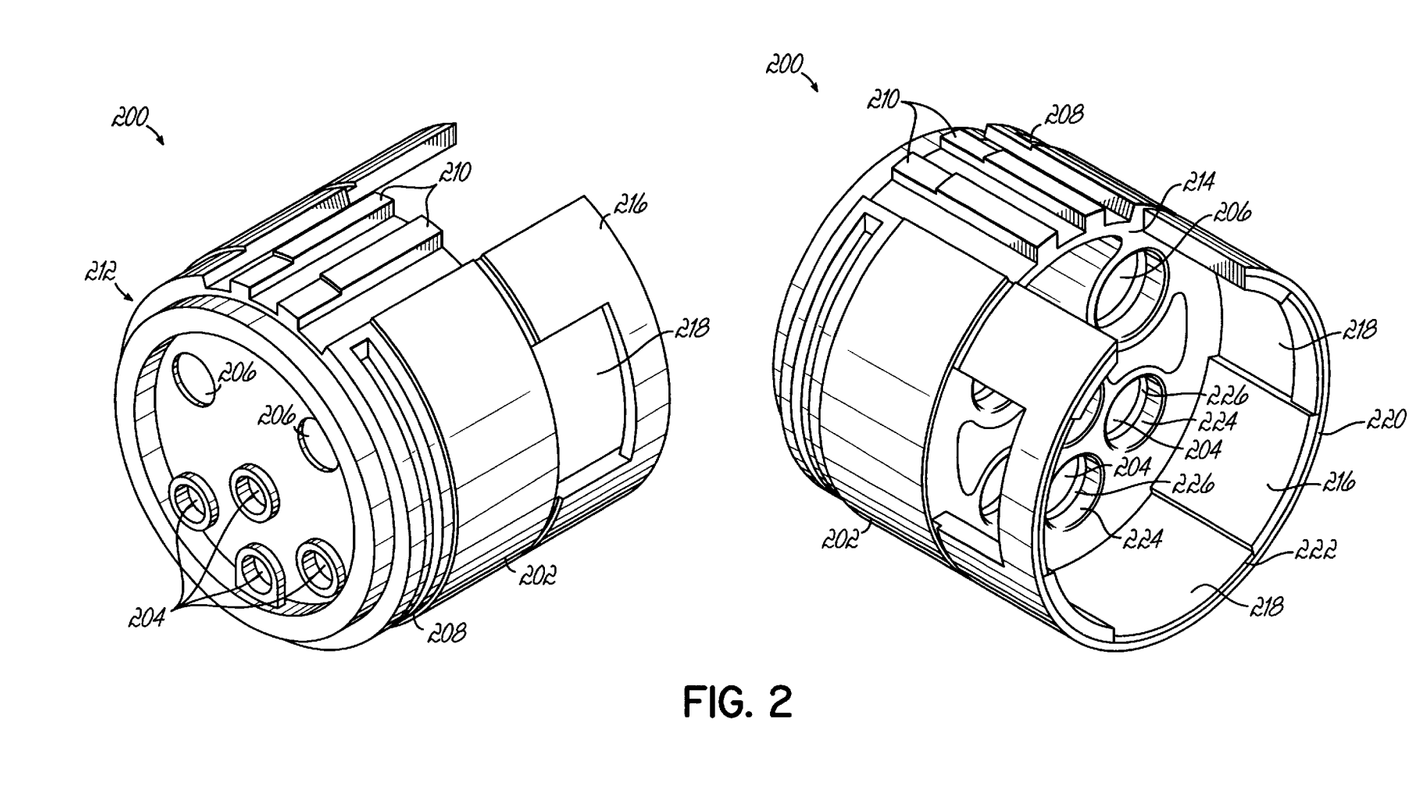
FIG. 2 is a schematic representation of an embodiment of the lower part of an inventive insulating body.
Figure 3:
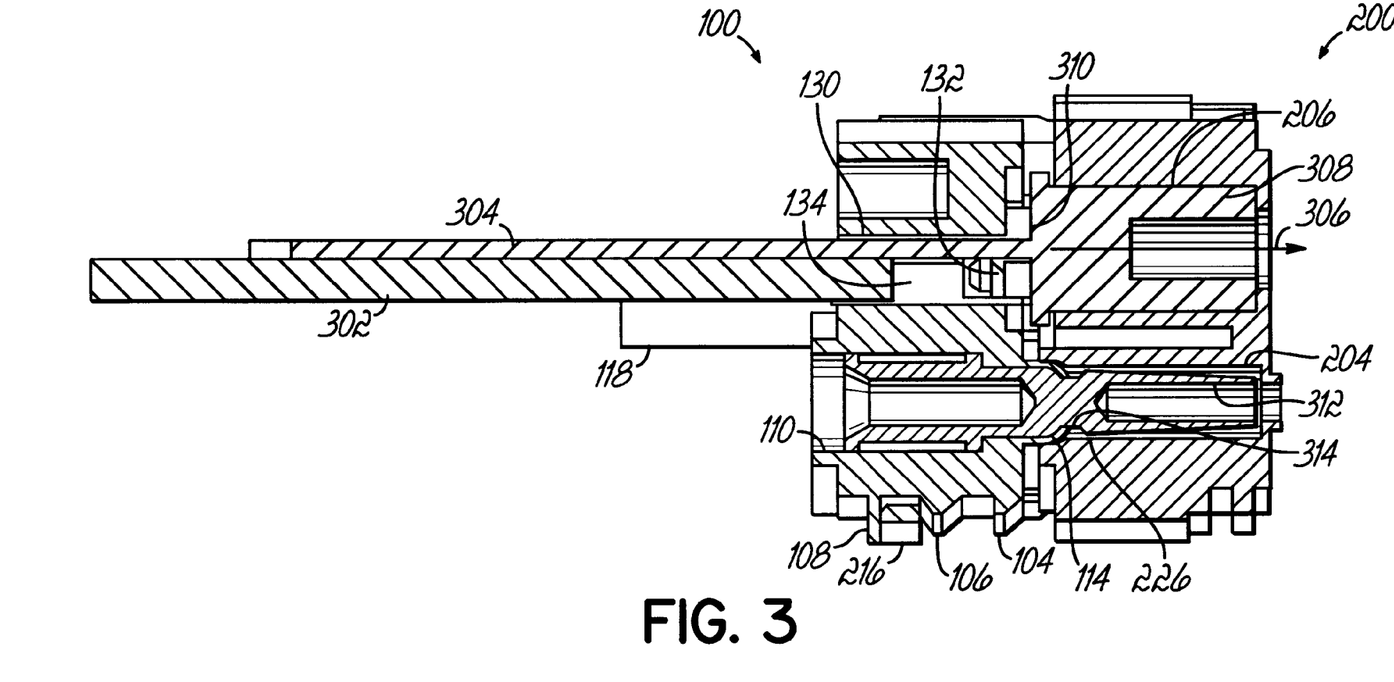
FIG. 3 is a schematic cross-sectional view of the lower part of FIG. 1 and of the upper part of FIG. 2 in the engaged condition.

With reference to FIGS. 1, 2, and 3 an insulating body will be described in detail. The insulating body comprises a lower part 100 shown in FIG. 1 and an upper part 200 shown in FIG. 2, the assembled and engaged condition of which to form the insulating body is shown in FIG. 3.

The lower part 100 comprises an elongated body with an essentially round cross-section, which comprises bushings in the longitudinal direction for optical and electrical conductors as well as a support for a printed circuit board formed therein, as will be described in detail in the following. At the outer circumference of the body 102 a first engaging element 104, a second engaging element 106, and a stop 108 are formed. The engaging elements 104 and 106 and the stop 108 extend in a radial direction around the outer circumference of the body 102, with the engaging elements 104 and 106 having an essentially trapezoidal cross-section, while the stop 108 has an essentially rectangular cross-section. In the illustrated embodiment the engaging elements 104 and 106 comprise three flanges each which, as will be described in the following, cooperate with the upper part 200 of the insulating body. Depending on the designs of the upper part 200 the first engaging element 104 and/or the second engaging element 106 each can also be formed integrally or comprise less or more than three components (flanges, notches).

The stop 108 is formed by an annular flange which is interrupted in an area of the outer circumference of the body 102, which is shown in the top of FIG. 1. Depending on the design of the upper part 200 it is provided in this case, too, that the stop 108 is formed by a completely closed annular flange or, similar to the engaging elements 104 and 106, by several elements.

The body 102 comprises four contact bushings 110 for electrical contacts each of which comprising a gripping collet 114 at the upper side 112 of the lower part 100, which is shown on the left hand side in the illustrations of FIG. 1. The gripping collets 114 are elastically designed in such a manner that electrical contacts (socket contacts) can be inserted into the body 102 from the bottom side 116 of the lower part 100, which is shown on the right hand side in the illustrations of FIG. 1, and as described in the following can be secured there by the gripping collets 114 in effective connection with the upper part 200.

From the bottom side 116 two printed circuit board locating elements 118 extend in the longitudinal direction of the body 102 with one each printed circuit board support 120 and one printed circuit board holder 122. The printed circuit board holders 122 extend in an essentially vertical direction to the longitudinal axis of the printed circuit board locating elements 118 and comprise one elastic protrusion 124 each. The elastic protrusions 124 serve to secure the printed circuit boards (not shown) when these are supported in contact with the printed circuit board supports 120 by the circuit board locating elements 118.

In addition, a printed circuit board receptacle 126 for the better securing of printed circuit boards in the body 102 is formed, which can accommodate one end area of the printed circuit board arranged on the printed circuit board supports 120. The printed circuit board receptacle 126 can be omitted if its holding function is taken over by correspondingly designed printed circuit board locating elements 118. For this purpose, for example, printed circuit board locating elements 118 can be used which in lieu of the printed circuit board supports 120 comprise two printed circuit board holders each or printed circuit board holders 122 which are enlarged in the longitudinal direction of the printed circuit board locating elements 118.

Moreover, the printed circuit board locating elements 118 comprise predetermined breaking points 128 in the areas adjacent to the body 102, in order to enable a convenient removal of the printed circuit board locating elements 118 if the insulating body is to be used without printed circuit boards.

An optical fibre bushing 130 extends in the longitudinal direction through the body 102, which is in connection with the printed circuit board receptacle 126 in the area of the bottom side 116 of the lower part 100. The use of an optical fiber bushing 130 for two optical fibers (not shown) permits to route these already in the area of the body 102 in such a manner that they can be connected with the corresponding points on a printed circuit board (not shown). Thus, it is no longer necessary to route optical fibres arranged in the lower part 100 in a straight manner through same in the longitudinal direction and to route them only in the area of a printed circuit board outside the body 102 to the corresponding connecting points. Consequently, the bending radii of non-straight optical fibers can be reduced, which reduces optical losses in the optical fibers. Moreover, smaller printed circuit boards can be used which reduces the overall construction of a plug-and-socket connection using the insulating body.

On the other hand, it is also provided to use an optical fiber bushing with a corresponding spring element for each optical fiber to be routed through the lower part 100. The connection of the optical fiber bushing 130 with the printed circuit board receptacle 126 in the area of the bottom side of the lower part 100 is also not mandatory, rather optical fiber bushings 130 designed separate from the printed circuit board receptacle 126 can be used.

In addition two spring elements 132 are formed in the area neighbouring the upper side 112, which extend in the optical fiber bushing 130 from same in a radial inward direction and transversely to its longitudinal direction. The spring elements 132 are elastic and comprise a protrusion or a flange 134 each at their inner end in the radial direction.

The upper part 200 comprises an elongated body 202 with an essentially round cross-section in which contact bushings 204 and optical fiber bushings 206 are formed corresponding to the contact bushings 110 and the optical fiber bushing 130 of the lower part 100. At the outer circumference of the body 202 engaging elements 208 and guide elements 210 are formed in the radial and longitudinal direction. The engaging and guide elements 208 and 210 are to be designed depending on the housing (e.g. TO250) of the connector in which the insulating body is to be used. The engaging elements 208 are therefore arranged at the outer circumference of the body 202 in the area of the upper side 212 of the upper part 200 in order,to enable a desired effective connection with a housing to be used.

At the bottom side 214 of the body 202 a distance collar 216 extends in its longitudinal direction. The distance collar 216 has an essentially round cross-section in the longitudinal direction and is interrupted in the areas shown in the top of the illustrations of FIG. 2 similar to the stop 108 of the lower part 100. The distance collar 216 further comprises three engagement windows 218 which serve for an engagement with one flange each of the first engaging element 104 or with one flange each of the engaging element 106 of the lower part 100. With reference to FIG. 1 it is to be noted that the number and design of the engagement windows 218 can be varied similar to the above mentioned modifications of the engaging elements 104 and 106 of the lower part 100, provided the effective connections of the engagement windows 218 with the engaging elements 104 and 106 are achieved.

The face 220 of the distance collar 216 opposite the body 202 serves as bearing support for the stop 108 of the lower part 100. This bearing support is formed in particular by a stepped area 222 of the face 220, which is suited for the form fitting accommodation of the stop 108.

The contact bushings 204 extend through the body 202 from its upper side 212 to its bottom side 214, with a mounting area 224 each for a corresponding gripping collet 114 being provided at the bottom side ends of the contact bushing 204. The mounting areas 224 have a diameter which allows the gripping collets 114 to be inserted without an elastic deformation of same. In the longitudinal direction of the contact bushing 204 a tapered area 226 adjoins each mounting area 224, which has a diameter which is smaller than the diameter of the mounting area 224 and which can elastically deform an inserted gripping collet 114. Upon insertion of the gripping collets 114 into the contact bushings 204 the gripping collets 114 are elastically deformed in a radially inward direction through the contact with the tapered areas 226 and thus permit to secure electrical contacts (not shown) as described in the following.

In order to use the insulating body, the lower part 100 and the upper part 200 are engaged with one another, with the first and second engaging elements 104 and 106 of the lower part 100 in an effective connection with the engagement window 218 of the upper part 200 allowing two engagement positions. The first engagement position which is given when the first engaging elements 104 engage in the engagement windows 218 allows an assembly and disassembly of electrical contacts (not shown). For this purpose, the first engaging elements 104, the gripping collets 114, the engagement windows 218, the mounting areas 224, and the tapered areas 226 are dimensioned in such a manner that, in the first engagement position, the gripping collets 114 project into the mounting areas 224 but are not in an effective connection with the tapered areas 226. Thus, the gripping collets 114 are not elastically deformed and electrical contacts can conveniently be inserted. After assembling the insulating body with the desired electric contacts, the second engaging elements 106 are engaged with the engagement windows 218 for achieving the second engagement position, with the gripping collets being elastically deformed in the tapered areas 226 in the contact bushings 204 in a radially inward direction. As will be described in the following with reference to FIG. 3 the gripping collets 114 which comprise an electrical contact engage one recess each of the corresponding electric contact and secure same in the insulating body.

For removing electrical contacts from the insulating body, the lower part 100 and the upper part 200 are brought into the first engagement position, whereby the tapered areas 226 release the gripping collets 114. The gripping collets 114 then not longer engage the recesses of corresponding contacts so that these can be conveniently removed.

The use of the two engagement positions, namely an assembly/disassembly position and a working position, permits to prepare the insulating body without additional tools.

As mentioned in the beginning, particular care must be taken in the transmission of optical signals that the damping of the optical signals to be transmitted is as low as possible in the contact areas of the components used in the transmission. In order to minimise the damping of optical signals in the insulating body it is to be ensured that, independent of the length tolerance of the housing components of a connector in which the insulating body is used, the lower part 100 and the upper part 200 as well as well as components arranged therein for the transmission of optical signals have a pregiven relative position in the second engagement position (working position). For this purpose, the distance collar 216 is provided which as a bearing support for the stop 108 ensures that the lower part 100 and the upper part 200 abut in alignment so that they invariably assume the same relative position in the closed position (i.e. the second engagement position).

In order to compensate tolerances of optical components of the insulating body the spring elements 132 of the lower part 100 are used. As will be described in more detail in the following with reference to FIG. 3, the spring elements 132 each press against a face of an optical element so that this contacts a corresponding (optical) counterpart of a connector which is used in connection with a connector comprising the insulating body without an intermediate air gap.

For assembling the insulating body with optical components these are arranged in the optical fiber bushing 130 of the lower part 100 before the lower part 100 is engaged with the upper part 200 in the first engagement position for the assembly of electrical contacts. This approach is necessary if optical fibers as shown in FIG. 3 are used. In order to arrange optical fibers in the first engagement position in the insulating body, optical fibers can be used for example which comprise notches or protrusions arranged on their outer circumference. In order to establish the desired effective connection with the spring elements 132 such optical fibers are twisted about their longitudinal axis in the insulating body in such a manner that the notches or protrusions contact the corresponding spring elements 132. Furthermore, it is possible to use spring elements which are at least partially spiral-shaped in lieu of the plate spring-type formed spring elements 132. In this case, the diameters of the spiral-shaped areas are to be dimensioned in such a manner that, on the one hand, optical fibers for arrangement in the insulating body can be routed through same and, on the other hand, a friction effect is generated between the optical fibers and such spring elements in order to provide their positioning function.

The attachment of a printed circuit board using the printed circuit board locating elements 118 to the insulating body can be carried out any time, depending on the application, during the assembly of the insulating body and/or its arrangement in housing components of a connector to be used. The use of a printed circuit board at the insulating body permits to connect circuits for the most different requirements in an integral manner with the insulating body and thus to integrate them in a connector to be used. Examples for circuits of such a printed circuit board are components for optical and/or electrical signal transmission, components for the conversion of electrical signals into optical signals and vice versa, microprocessors, and the like. If no printed circuit board is to be used in connection with the insulating body, the printed circuit board locating elements 118 can be conveniently removed from the lower part 100 because of the predetermined breaking points 128.

In FIG. 3 the insulating body is shown in the second engagement position (i.e. the working position: the second engaging elements 106 are engaged in the engagement windows 218 and the 10 stop 108 together with the distance collar 216 provides for the desired positioning of the upper and lower part 100, 200) with optical and electrical components for signal transmission. Using the printed circuit board locating elements 118 a printed circuit board 302 is attached at the lower part 100, with a printed circuit board stop 134 not shown in FIG. 1 in the printed circuit board receptacle 126 serving for a desired positioning of the printed circuit board 302.

In the optical fiber bushings 130 and 206 of the lower and upper part 100 and 200 an optical fiber 304 is arranged which is urged in the direction of arrow 306 by the spring element 132 in order to contact a corresponding contact as explained with reference to FIG. 4. In particular, the optical fiber 304 comprises a socket-shaped optical fiber end 308, at the face 310 of which the spring element 132 attacks. In lieu of the socket-shaped optical fiber end 308 the optical fibre 304 may comprise a pin-shaped end for contact with a correspondingly shaped (socket-shaped) optical fiber (not shown), whereby the optical fiber 304 must be formed in the area of the spring element 132 in such a manner that this can attack at the optical fiber 304 in order to urge same in the direction of arrow 306 (in FIG. 3 to the right).

Figure 4:
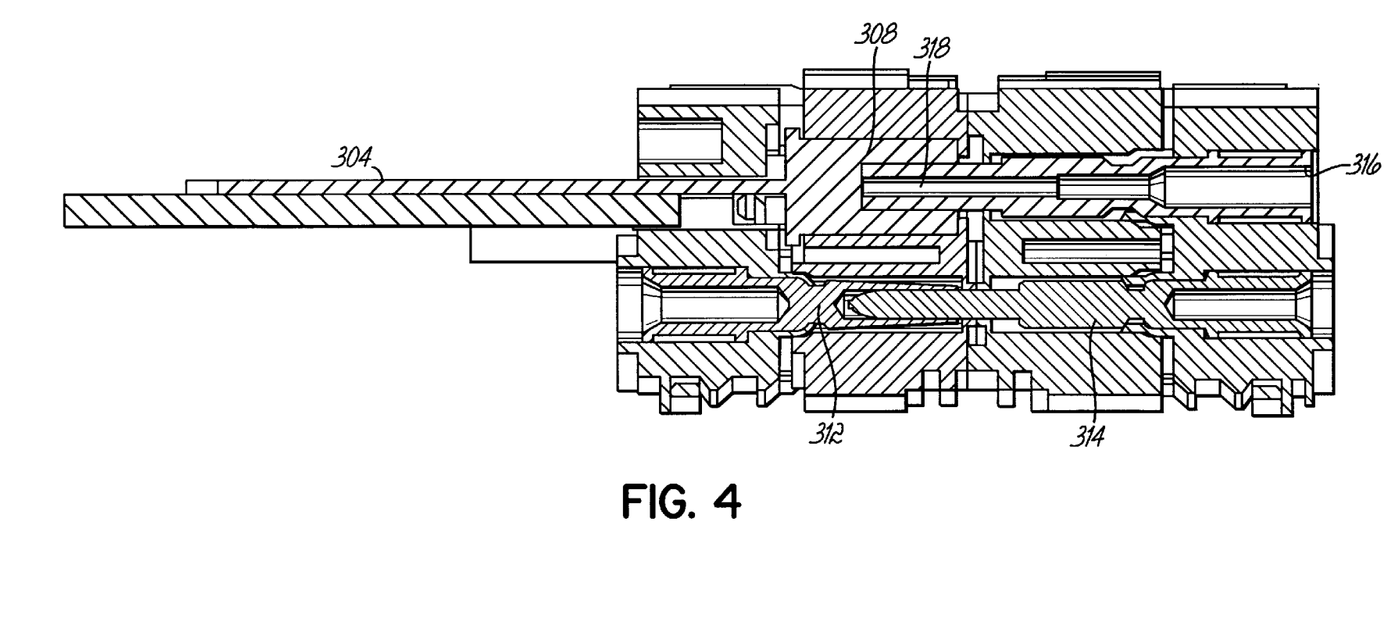
FIG. 4 is a schematic cross-sectional view of the insulating body of FIG. 3 in a connector.

In the contact bushings 110 and 204 of the lower and upper part 100 and 200 an electrical contact 308 for accepting a contact pin shown in FIG. 4 is arranged. As mentioned above, a contact formed as a pin contact can be used in the area of the upper part 200 in lieu of the contact 312 formed as a socket. As described above with reference FIGS. 1 and 2, the gripping collet 114 shown in FIG. 3 is elastically deformed in a radially inward direction by the correspondingly tapered area 226 in the contact bushing 204. The gripping collet 114 therefore engages a contact recess 314 of the contact 312 and in this manner secures same in the insulating body.

In the example shown in FIG. 3 it is assumed that the printed circuit board 302 comprises active semiconductor elements in order to convert optical signals received via the optical fiber 304 into corresponding electrical signals and electrical signals for transmission via the optical fiber 304 into optical signals.

FIG. 4 shows a connection for the transmission of optical and electrical signals using the insulating body by means of a connector, the housing components of which have been omitted in the figure. Electrical signals are transmitted via the contact 312 and a contact pin 314, with their shape in corresponding contacting areas ensuring a reliable electric signal transmission.

Optical signals are transmitted via the optical fiber 304 and an optical fiber 316 which for contact making with the socket-shaped optical fiber end 308 comprises a correspondingly shaped pin contact 318.

In lieu if the optical fiber 304 and 316 it is also provided to use conductors of so-called "twisted pair" lines.

What is claimed is:

1. An insulating body for a connector for the transmission of optical and electric signals, comprising;
    a lower part (100) with first bushings (130) for electrical conductors and with a first engaging element (104), a second engaging element (106), and a stop (108), and
    an upper part (200) with a distance collar (216) and an engagement means (218) arranged at the distance collar (216), whereby
    in a first engagement position the first engaging element (104) is engaged with the engagement means (218),
    in a second engagement position the second engaging element (106) is engaged with the engagement means (218), and
    in the second engagement position the stop (108) is in a mechanical effective connection with the distance collar (216), characterized in that
    the lower part (100) comprises first bushings (130) for optical fibers (304), and
    in at least one of the first bushings (130) a spring element (132) is arranged which in the second engagement position generates a spring force acting on an electrical or optical conductor (304) arranged in a corresponding one of the first bushings (130) in the longitudinal direction thereof.

2. The insulating body according to claim 1, characterized in that the spring element (132) in the first engagement position generates a spring force acting on an electrical or optical conductor (304) arranged in a corresponding first bushing (130), which is smaller than the spring force in the second engagement position.

3. The insulating body according to claim 1, characterized in that the lower part (100) comprises means (118, 120, 122, 124, 126, 128) for the structurally consistent integration of a printed circuit board (302).

4. The insulating body according to claim 1, characterized in that the lower part (100) comprises second bushings (110) for electrical conductors (312), with at least one of the second bushings (110) for electrical conductors (312) comprising a gripping collet (114) which, in the second engagement position assumes a locking position for securing an electrical conductor (312).

5. The insulating body according to claim 4, characterized in that the gripping collet (114) in the first engagement position for assembly or disassembly of electrical conductors (312) assumes a release position.

6. The insulating body according to claim 4, characterized in that the upper part (200) comprises bushings (204) for electrical conductors (312) associated with the second bushings (110) for electrical conductors (312) of the lower part (100), with the gripping collet (114) assuming the locking position in the second engagement position due to a mechanical effective connection with an area (226) of the associated bushings (204) of the upper part (200).

7. The insulating body according to claim 6, characterized in that one of the bushings (204) for electrical conductors (312) of the upper part (200) associated with the at least one gripping collet (114) comprises a mounting area (224), with the corresponding gripping collet (114) being arranged at least partially in the mounting area (224) in the first engagement position.

8. The insulating body according to claim 1, characterized in that the first and/or second engaging elements each are integral and/or comprise several notches each.

9. The insulating body according to claim 1, characterized in that the engagement means (218) of the upper part (200) comprises at least one engagement window (218) formed in the distance collar (216) and/or at least one recess formed in the distance collar (216).

10. The insulating body according to claim 1, characterized in that the spring element (132) is a plate spring-type spring element extending transversely to the longitudinal direction of the second bushing (130).

11. The insulating body according to claim 1, characterized in that the spring element (132) is designed as an at least partially spiral-shaped spring element for at least partially surrounding an optical or electrical conductor (304).

12. The insulating body according to claim 3, characterized in that the means for the structurally consistent integration of a printed circuit board (302) comprises two printed circuit board locating elements (118) extending from the lower part (100) in the longitudinal direction of the insulating body.

13. The insulating body according to claim 3, characterized in that the means for the structurally consistent integration of a printed circuit board (302) comprises a printed circuit board receptacle (126) formed in the lower part (100), which is at least partially connected with the bushing (130) of the lower part (100) for optical or electrical conductors.

* * * * *

UNITED STATES PATENT AND TRADEMARK OFFICE
CERTIFICATE OF CORRECTION

PATENT NO.      : 6,518,506 B2
DATED           : February 11, 2003
INVENTOR(S)     : Markus Zink and Frank Andrä

It is certified that error appears in the above-identified patent and that said Letters Patent is hereby corrected as shown below:

Column 1,
Line 27, "fibre" should read -- fiber --.

Column 2,
Lines 9, 10 and 12, "fibre" should read -- fiber --.

Column 4,
Line 66, ..."connectors with a rectangular cross-sections are..." should read
-- connectors with rectangular cross-sections are... --.

Column 6,
Line 30, "fibre" should read -- fiber --.
Line 38, "fibres" should read -- fibers --.

Column 7,
Line 6, "in order,to enable" should read -- in order to enable --.

Column 8,
Line 8, "collets 114 then not longer engage the..." should read -- collets 114 then no longer engage the... --.
Line 22, "part 200 as well as well as components" should read -- part 200 as well as components --.

Column 9,
Line 15, "and the 10 stop 108 together with" should read -- and the stop 108 together with --.

UNITED STATES PATENT AND TRADEMARK OFFICE
CERTIFICATE OF CORRECTION

PATENT NO.    : 6,518,506 B2
DATED         : February 11, 2003
INVENTOR(S)   : Markus Zink and Frank Andrä

It is certified that error appears in the above-identified patent and that said Letters Patent is hereby corrected as shown below:

Column 10,
Line 1, "In lieu if the optical fiber" should read -- In lieu of the optical fiber --.
Line 5, "… comprising;" should read -- … comprising: --.

Signed and Sealed this

Twenty-fourth Day of June, 2003

JAMES E. ROGAN
*Director of the United States Patent and Trademark Office*